March 10, 1970  H. LUDWIG  3,499,190
INJECTION MOLDING SHOE BOTTOMS
Original Filed Aug. 18, 1966  2 Sheets-Sheet 1
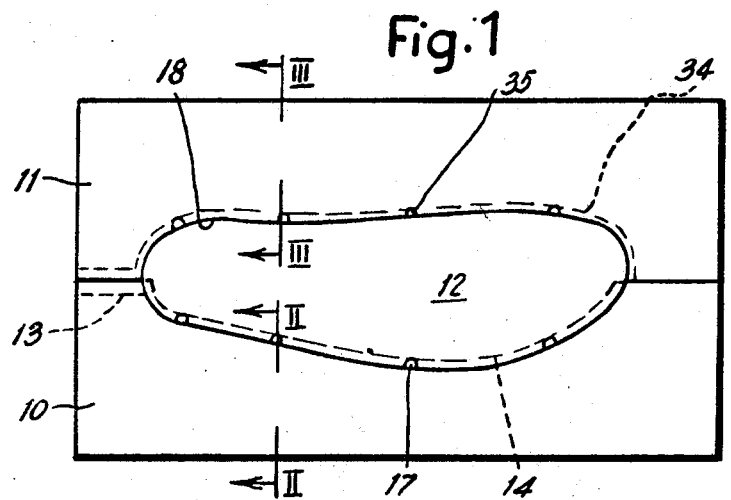
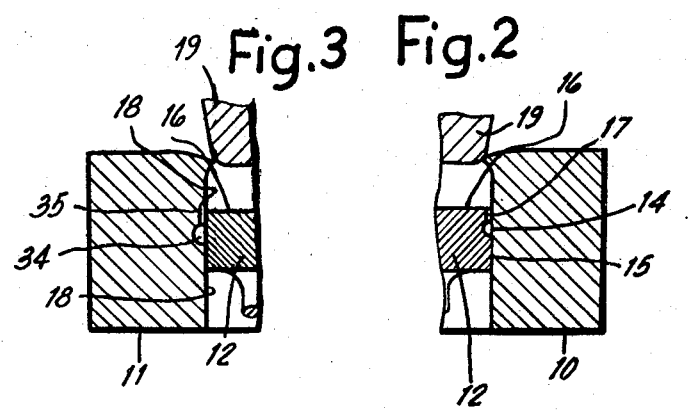
INVENTOR.
Herbert Ludwig
BY
Attorney

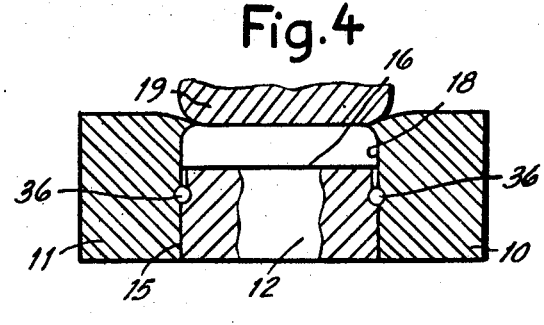
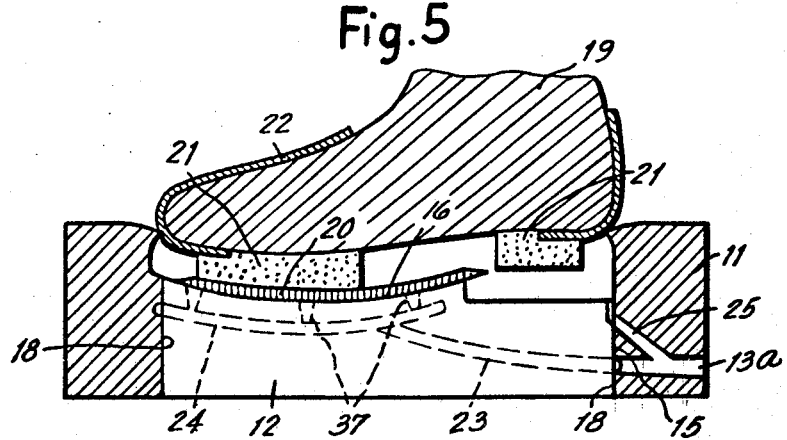
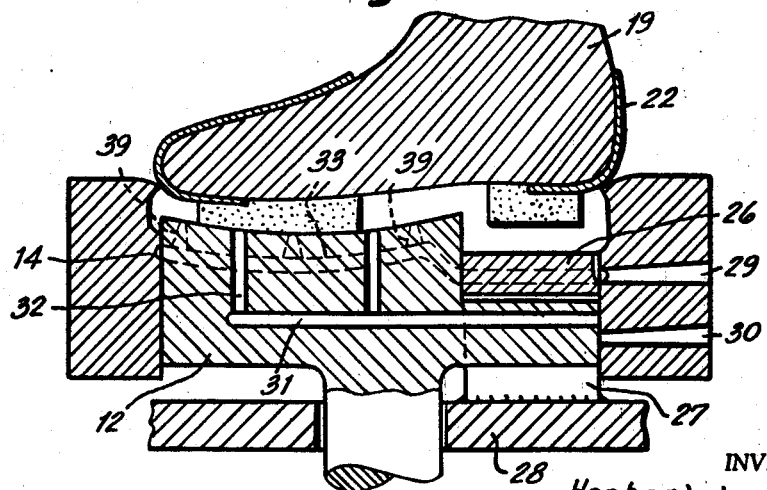

United States Patent Office 3,499,190
Patented Mar. 10, 1970

3,499,190
INJECTION MOLDING SHOE BOTTOMS
Herbert Ludwig, Desmastr. 112, Uesen,
near Bremen, Germany
Continuation of application Ser. No. 573,239, Aug. 18, 1966. This application Dec. 23, 1968, Ser. No. 786,851
Claims priority, application Germany, Oct. 26, 1965, D 48,516
Int. Cl. B29c 1/00
U.S. Cl. 18—42                                    4 Claims

ABSTRACT OF THE DISCLOSURE

A mold assembly comprising a side ring having an open top and bottom, on the top of which is adapted to be held a lasted upper and at the bottom of which a sole plate is supported for movement within the side ring relative to the bottom of the lasted upper, and passages in the side ring and sole plate adapted to carry plastisol into the mold cavity at a plurality of points peripherally thereof.

---

This application is a continuation of Ser. No. 573,239, filed Aug. 18, 1966, now abandoned.

The present invention relates generally to apparatus for injection of soles or parts thereof of either one kind of plastic or of different kinds of plastic and/or different colored plastics to shoe uppers. More specifically, the present invention relates to apparatus which comprises a ring and a sole plate being moveable heightwise within the ring and relative to the bottom of an upper supported by a last held engaged with the ring above the sole plate, and the method of using this apparatus. The apparatus may also be used with foam or rubber or in applications where a preformed part, such as a portion of the treadsole which may be formed of leather, may be positioned on the sole plate prior to injection.

It is customary in apparatus of this kind to employ a split ring containing one or more injection passages which can be aligned with one or more passages in the sole plate to conduct the plastic bottom forming compositions to the mold cavity so as to form one or multi-part soles such as an inner sole, an outer sole, sole edges and the like and by adjustment of the heightwise position of the sole plate in the ring to inject bottom forming composition of one kind or color to one part of the cavity exclusively of another part. These passages have heretofore been confined to the dividing plane of the mold which is along a median from the heel to the toe with the injection channels running through the sole plate along this median and having one or more orifices leading into the mold cavity, as may be best observed in my co-pending application Ser. No. 533,189, filed Mar. 10, 1966.

Experience has shown with these types of injection passages that it is very difficult to remove the sprue from the injection passage after the cooling period is completed and this is particularly true with certain types of plastic materials, such as those that have expanding agents therein for the making of foamed soles. Even if the orifices are constructed slightly conical, it has been found that some of the sprue remains stuck in the passages which may lend to undesirable difficulties.

It is further known to eliminate the injection passage running through the sole plate and to inject the plastic material via an injection channel which communicates directly with the mold cavity, preferably at the heel end portion. This type of arrangement has proven to be disadvantageous because the flow route of the injected material from the heel end to the toe portion is then rather long and, as a result, the material will not distribute itself evenly through the mold cavity, especially when the cavity is relatively large and relatively viscous and hard flowing material is used. This is so since the composition entering through the heel portion has to overcome the cooling effect of the surface of the mold and surface adhesion which retard uniform flow toward the toe end portion and the edges.

This difficulty of lack of rapid and uniform flow is especially apparent in instances where preformed parts, which may be made of leather or other like materials, are to be incorporated into the treadsole of the shoe. In such cases, it has been frequently found that the injected material did not reach the forepart or the edge part of the sole, resulting in faulty or unuseable footwear.

The present invention has for its purpose the elimination of these difficulties by providing an improved apparatus for the injection molding of shoe bottoms. More particularly, it is a principal object of the invention to provide an improved apparatus that will eliminate the difficulty heretofore encountered and that will permit the easy removal of sprue from the injection passage after the cooling period is completed. It is a further object of the present invention to provide an improved apparatus that allows for the rapid and uniform distribution of the molding compound so as to fill the entire mold cavity quickly and thoroughly, including the forepart and the edge part of the sole.

According to the invention, the improved apparatus for injection molding of shoe bottoms comprises a ring, a sole plate being movable heightwise within the ring and defining therewith a bottom-forming cavity in conjunction with a lasted upper brought into engagement with upper portion of the ring, in which the ring and the sole plate define an injection passage at their interfaces running peripherally around the cavity, with the peripheral passage being provided with a plurality of orifices communicating with the cavity to conduct the molding compound into the cavity at a plurality of equidistantly spaced points marginally of the cavity so that the molding compound does not have to travel long distances over the interior surface of the mold.

The peripherally placed injection passage may be formed conveniently in the outside surface of the sole plate itself or it may be formed in the inside surface of the ring or if desired, it may be formed partially in the outside surface of the sole plate and the inside surface of the ring. In addition, such a peripherally formed injection passage may be used in conjunction with the well known injection passage that runs through the sole plate at the median thereof with the latter injection passage being formed at a distance below the peripherally formed injection passage. This latter combination of two injection passages may be most advantageously used in the forming of multi-part soles by double injection and/or where inserts for the sole forming part or the heel forming part are employed.

One of the principal advantages of the improved method of using the apparatus of the invention resides in that the sprue, following the injection process and after the ring has been opened, may be conveniently sheared off by either slightly lowering the sole plate or raising the last and the sprue may then be conveniently and without difficulty removed from the injection channel. Another advantage of the improved method in using the apparatus of the invention resides in that the molding compound will rapidly and uniformly fill up the entire mold cavity, including the toe parts and the side edges. Since the number of equidistantly placed orifices communicating with the mold cavity can be selected as desired, even large soles may be conveniently injection molded without difficulties. Furthermore, the improved method in using the apparatus of the invention is of great advantage in the injection of multi-part soles in which preformed sole parts are to be placed on the sole plate to form the tread portion of the sole, since the improved method assures a perfect filling of the narrow edges, imbedding such preformed sole parts, even if such edges are to be very narrow.

The invention will now be described in greater detail with reference to the accompany drawings wherein:

FIG. 1 is a plan view of an injection molding apparatus comprised of a ring and a sole plate and constructed in accordance with and embodying the present invention and showing two examples for the positioning of the peripherally arranged injection passage;

FIG. 2 is a section along the line II—II of FIG. 1 and also shows a portion of a last with the injection passage arranged in the outer surface of the sole plate;

FIG. 3 is a section along the line III—III of FIG. 1 and also shows another portion of a last with the injection passage arranged in the inner surface of the ring;

FIG. 4 is a section of a mold together with a portion of a last and showing an alternative arrangement in which the injection passage is formed partially in the outer surface of the sole plate and partially in the inner surface of the ring;

FIG. 5 is a longitudinal cross section through a mold and a lasted upper provided with inserts and an inserted sole part and showing a further alternative arrangement for the injection passage; and FIG. 6 is a longitudinal cross section similar to that shown in FIG. 5, but in which in addition to a peripherally arranged injection passage there is also provided a second conventional injection passage running through the sole plate, showing also an insert for forming the heel part of the shoe; the shown arrangement being primarily for use in the injection molding of multipart soles.

Referring to FIGS. 1 and 2, the improved apparatus for the injection molding of shoe bottoms comprises a longitudinally split mold ring composed of mold halves 10 and 11 which may be moved sideways to open the mold. A sole plate 12 is shown surrounded by the mold halves 10 and 11 and is preferably mounted for vertical movement within the ring, as is well known in the art. In the dividing plane of the mold halves 10 and 11 is provided a main injection channel 13 that communicates with the peripherally arranged injection passage 14 that is formed in the sole plate at a short distance below the top surface 16 thereof, as may be best observed in FIG. 2. It is to be understood that this injection passage 14 is formed peripherally all around in the outside surface 15 of the sole plate from one end of the heel portion to the toe portion and back at the other side. As may be further observed in FIGS. 1 and 2, the peripheral injection passage 14 is provided with a plurality of orifices 17 equidistantly spaced from one another around the periphery of the mold cavity. This mold cavity is defined by the ring, the top surface 16 of the sole plate 12 and by the bottom of a shoe last 19, as may be observed in FIG. 2.

In FIG. 3, the peripherally formed injection passage 34 is formed in the inner surface 18 of the ring rather than in the outer surface 15 of the sole plate 12 as shown in FIG. 2. In all other respects, this apparatus is identical in operation with that shown in FIGS. 1 and 2, with the orifices indicated by the reference character 35.

In FIG. 4, the peripherally formed injection passage 36 is shown as being formed partially in the outside surface 15 of the sole plate 12 and partially in the inner surface 18 of the mold halves 10 and 11.

FIG. 5 depicts a longitudinal cross section of a mold which employs a different alternative for the peripherally formed injection passage. As may be observed, a last 19 is provided with an upper 22, insert 21 and a preformed treadsole 20 which may be positioned on the top surface 16 of the sole plate 12, substantially as shown. The main injection passage 13a is once again formed in the dividing plane of the mold halves, but in addition to communicating with the peripherally formed injection passage 24 via a median distribution channel 23, it also branches off via a branch channel 25 leading directly into the mold cavity at the heel end portion. In addition, it should be noted that the peripherally formed injection passage 24 this time does not surround the entire mold cavity as defined by the sole plate 12, but is rather restricted to surrounding the forepart of the sole only from the heel breast line forward toward the toe portion. This is because the branch channel 25 already conducts the molding compound directly to the heel end portion to form the heel of the shoe. It should also be noted that the orifices 37 leading from the injection passage 24 into the mold cavity taper away from the cavity and toward the passage 24.

FIG. 6 is a view similar to FIG. 5 except that this arrangement is particularly suited for the injection molding of multi-part soles made of different kinds of plastic and/or different colored plastic materials. It features a replaceable U-shaped heel insert 26 provided with a pair of legs 27 by which it may be secured to a stationary plate 28 of the injection molding apparatus. By selecting the proper heel insert 26, the height, shape and contour of the heel to be formed may be appropriately determined. The arrangement as shown in FIG. 6 provides for a first injection to form the heel portion through the injection passage 29 which has a communication directly with the heel end as well as with the peripherally formed injection passage 33 that again surrounds only the forepart of the shoe in front of the heel breast line. From the injection passage 33, equidistantly and peripherally placed orifices 39 communicate into the mold cavity to form the forepart, the edges and the shank portion of the inner sole. These orifices 39 taper toward the mold cavity in contradistinction to the orifices 37 shown in FIG. 5 which taper away from the mold cavity.

Following the first injection through channels 29 and 33, the sole plate 12 is allowed to drop at a distance so that the second injection passage 30 will now communicate with the second conventionally formed injection passage 31 which runs through the sole plate at a distance below the peripherally positioned injection passage 33 and centrally through the median of the sole plate. The second injection passage 31 communicates through orifices 32 with the mold cavity, it being understood that these orifices 32 are positioned centrally on the median line of the sole plate. This second injection, which may be of a different kind of plastic or different color plastic, will form the outsole of the injection molded shoe bottom in a manner well known to those skilled in the art. It should be noted, however, that the second injection will form the outsole of the shoe only in front of the heel breast line since the U-shaped heel insert 26 will not drop, but will rather remain stationary as it is being supported on the legs 27 by the stationary plate 28.

As constructed, the improved apparatus and method for the injection molding of shoe bottoms enables the injection forming of such bottoms to shoe uppers in a uniform manner without causing any difficulties in removing the sprue from the distribution channel, and allowing for a more rapid and uniform distribution of the injection molding compound to all parts of the mold cavity. Since the number of the equidistantly spaced orifices may be varied the apparatus of the invention allows for the uniform filling of any and all sizes of molds evenly so as to form acceptable footwear.

It should be understood that the present disclosure is for the purpose of illustration only and that this invention includes all modifications and equivalents which fall within the scope of the appended claims.

I claim:

1. A mold assembly for injection molding of shoe bottoms comprising a side ring containing an opening providing a smooth side wall corresponding in configuration to the peripheral edge of the bottom to be formed, said side wall being of greater depth than the thickness of the bottom to be formed and said opening being open at the top and bottom, a peripheral lip at the top of the opening providing a seat adapted to support a lasted upper at the top, a sole plate corresponding in configuration to the opening in the side ring, said sole plate having a smooth peripheral side wall slidably interengaged with the side wall of the opening in the side ring, and a flat top, said sole plate being supported for movement within the side ring relative to the bottom of a lasted upper supported on the lip to position its upper surface at a distance from the bottom of the lasted upper corresponding to the thickness of the bottom to be formed, said side wall of the ring and said side wall of the sole plate collectively providing between their slidably engaged surfaces and below the top surface of the sole plate a continuous passage around the sole plate, and a plurality of peripherally spaced orifices providing the only connection between said passage and the mold cavity throughout the heightwise adjustment of the sole plate in the side ring.

2. Apparatus according to claim 1, wherein the passage and orifices are constituted by grooves formed in the smooth side wall of the sole plate and by the smooth confronting side wall of the ring.

3. Apparatus according to claim 1, wherein the passage and orifices are constituted by grooves formed in the smooth side wall of the ring and by the smooth side wall surface of the sole plate.

4. Apparatus according to claim 1, wherein said passage and orifices are constituted by grooves formed partially in the side wall of the sole plate and partially in the side wall of the ring.

References Cited

UNITED STATES PATENTS

| 2,799,435 | 7/1957 | Abplanalp | 264—328 X |
| 3,315,317 | 4/1967 | Winkler | 18—42 |
| 3,319,301 | 5/1967 | Ludwig | 18—42 |
| 3,368,245 | 2/1968 | Witkowski | 18—30 X |

FOREIGN PATENTS 1,115,912  10/1961  Germany.

J. HOWARD FLINT, JR., Primary Examiner
MICHAEL O. SUTTON, Assistant Examiner

U.S. Cl. X.R.

18—30, 34